Sept. 24, 1968 E. A. KOLM 3,403,358

COMPOSITE PIEZOELECTRIC FILTER METHOD AND MEANS

Filed June 9, 1964 2 Sheets-Sheet 1

INVENTOR
ERIC A. KOLM
BY
Blair & Buckles
ATTORNEYS

COMPOSITE PIEZOELECTRIC FILTER METHOD AND MEANS

Filed June 9, 1964 2 Sheets-Sheet 2

INVENTOR.
ERIC A. KOLM

BY

Blair & Buckles
ATTORNEYS

United States Patent Office 3,403,358

Patented Sept. 24, 1968

3,403,358
COMPOSITE PIEZOELECTRIC FILTER METHOD AND MEANS

Eric A. Kolm, Brookline, Mass., assignor to Sonus Corporation, Cambridge, Mass.

Filed June 9, 1964, Ser. No. 373,612
3 Claims. (Cl. 333—72)

ABSTRACT OF THE DISCLOSURE

An electrical filter is constructed using a plurality of piezoelectric coupling elements. Each coupling element consists of a pair of piezoelectric crystals cemented together face to face. Each element is then subjected to a direct voltage in excess of that required to polarize it, but less than the stress limit voltage for the ceramic. Two or more of the elements are electrically connected together in cascade so that their axes of polarization are aligned. That is, the input signals applied to all of the coupling elements in the filter are applied across the transducers having the same polarity sign. Likewise, the outputs from all the coupling elements are taken from transducers having the same polarity sign.

This invention relates to piezoelectric filters, and more particularly to a composite filter employing a pair of similar piezoelectric coupling elements appropriately mounted in a single fixture and operated in unison. By appropriately polarizing the individual elements, the filter obtains greatly improved passband characteristics.

A great deal of effort has been expended in an endeavor to improve the frequency response characteristics of piezoelectric coupling elements. This has been true particularly in the case of coupling elements of the sandwiched-together or laminated type having individual ceramic transducers acoustically coupled together. Considerable progress has been made in this regard by improving the acoustical coupling between the individual transducers through use of improved bonding adhesives, and also through utilization of acoustical absorbers between the individual transducers to absorb energy due to unwanted vibrations in the coupling element. Thus, manufacturers have been able to shape somewhat the response curve of these laminated coupling elements.

But the prior methods employed to obtain the desired bandwidth and skirt selectivity by appropriately changing the acoustical coupling between the transducers had attendant disadvantages. For example, in the case of coupling elements employing acoustical cushioning members, there was some sacrifice in operating efficiency as a result of energy losses due to absorption by the cushioning member.

In addition, prior procedures for this required the coupling elements to actually have different makeups or physical geometries depending on the particular bandwidths or characteristic curves desired. This, of course, increased manufacturing costs and required the keeping of a large inventory not only of coupling elements having different frequencies but also a multitude of coupling elements of the same frequency but having different passband characteristics. Also, when these prior elements were placed in use, a large number of them were found unaccountably to have spurious frequency responses which interfered with their proper functioning in the particular circuit. When used as filters in I.F. receiver circuits, for example, the filter stages became detuned. Moreover, when connected in cascade, these coupling elements very often actually caused the circuit to oscillate.

Accordingly, this invention aims to provide an improved technique for making piezoelectric filters so as to possess a particular selected bandwidth.

A further object of this invention is to provide piezoelectric filters which have a wide bandwidth, yet sharp skirt selectivity.

A still further object of this invention is to improve the art of piezoelectric filter manufacture by shaping the filter frequency response by means of the applied polarization voltage.

Another object of this invention is to provide an improved filter circuit employing a plurality of coupling elements connected in cascade.

It is another object of this invention to provide a piezoelectric filter having improved frequency response characteristics.

Another object of this invention is to provide a piezoelectric filter having exceptionally high sensitivity.

A further object of this invention is to provide a piezoelectric filter which is small, lightweight and ideally suited for miniaturized circuits.

Still another object of this invention is to provide such a filter having a low attenuation within the passband and a high rejection rate outside of the passband.

Other objects of the invention will in part be obvious and will in part appear hereinafter.

The invention accordingly comprises the several steps and the relation of one or more of such steps with respect to each of the others, and the article possessing the features, properties, and relation of elements and arrangement of parts which will be exemplified in the constructions hereinafter set forth, and the scope of the invention will be indicated in the claims.

For a fuller understanding of the nature and objects of this invention, reference should be had to the following detailed description taken in connection with the accompanying drawings, in which.

The filters with which this invention is concerned are used in electric circuits to pass only those signals having frequencies within a specified passband.

They are used in I.F. stages of audio circuits, for example, to pass the desired signals with substantially no attenuation and yet to exclude low frequency signals, such as 60-cycle pickup, and also high frequency signals such as harmonics of the desired input signal. A sharp cut-off characteristic on each side of the center frequency is desired so that unwanted frequencies just outside the passband are completely rejected. Further, it is desirable that the filter produce uniform, but negligible attenuation within the passband so that the relative amplitudes of the selected signals will be preserved.

In general, my composite filter employs a pair of similar coupling elements of the laminated or sandwiched-together type. The individual coupling elements are described in greater detail in the co-pending application of Fowler et al., Ser. No. 75,321, now abandoned, assigned to the assignee of the present application. The bandwidths of the coupling elements are shaped as desired by subjecting each element to a determined polarization voltage as will be described later. The two coupling elements are electrically connected together in series such that their axes of polarization point in the same direction, and are supported, via their leads, within a single fixture or can. The resultant composite filter has a passband of the desired width and also has very sharp cut-off characteristics. The filter obtains a very low attenuation within the passband, but exceptionally high attenuation outside of the passband, enabling the filter to be utilized in electronic circuits where extremely precise filtering is required. And when a plurality of filters are used in a circuit, they are cascaded so that their axes of polarization are all aligned thereby inhibiting oscillation in the circuit.

Figures 1, 2:
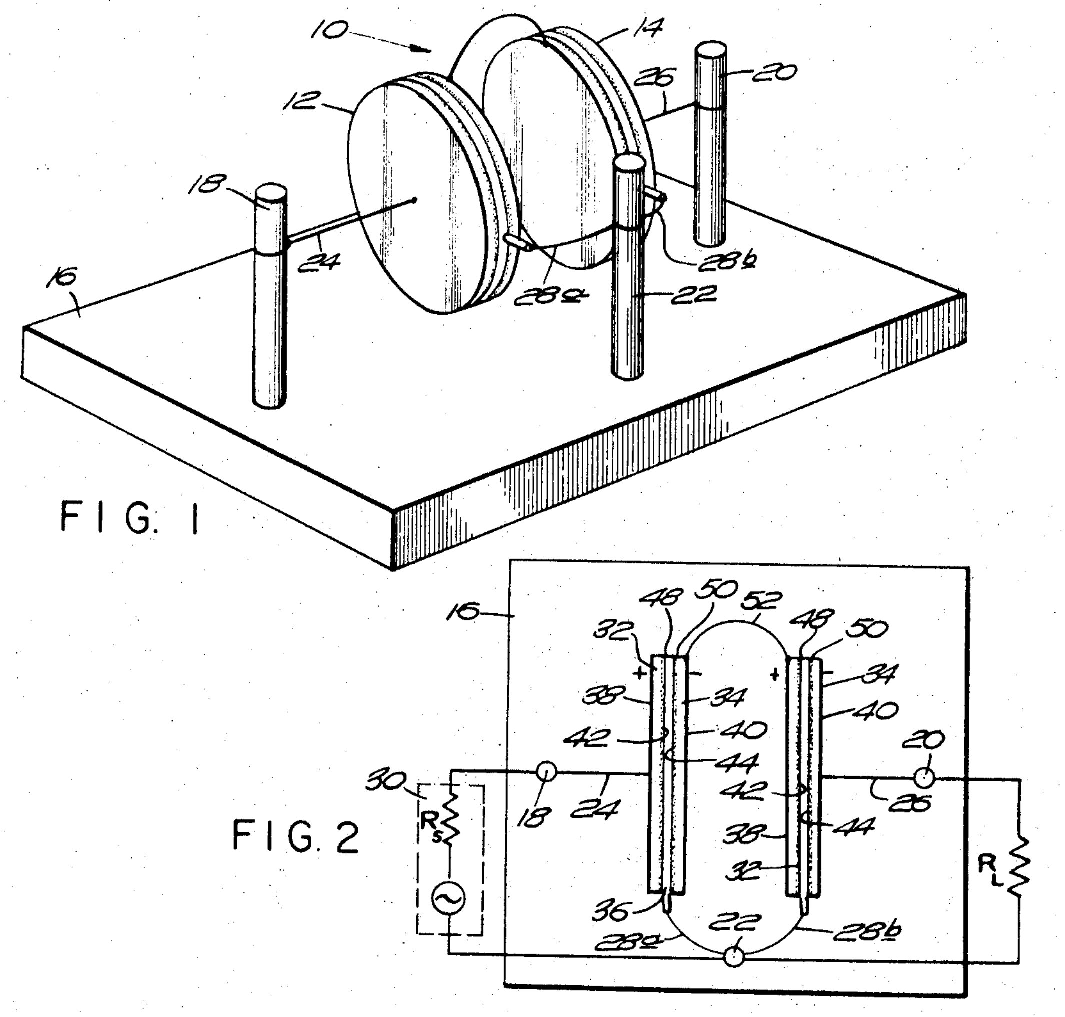
FIG. 1 is a perspective view of a piezoelectric filter embodying the present invention.
FIG. 2 is a schematic diagram of the filter of FIG. 1 incorporated into a frequency selective circuit.

Referring to FIG. 1 of the drawings, my improved composite filter indicated generally at 10 is shown to comprise a pair of similar piezoelectric coupling elements 12 and 14 mounted within a single can 16 whose top has been removed for purposes of illustration. The elements are polarized as will be described presently. Filter 10 is suspended from spaced posts 18, 20 and 22, mounted within and extending without, the can 16. In this, a lead 24 from coupling element 12 is connected to post 18. Another lead 26 from coupling element 14 is connected to post 20, while a common lead **28*a* and 28*b* from coupling elements 12 and 14 is connected to post 22. In addition to supporting filter 10 the posts 18, 20 and 22** also serve as terminals for connecting the filter into a circuit.

Refer now to FIG. 2 which shows my composite filter 10 connected between a source 30 which includes an internal resistance indicated by resistor $R_S$ and a load indicated by the resistor $R_L$. Each coupling element 12 and 14 of filter 10 comprises a pair of similar ceramic transducers 32 and 34 bonded together through a common conductor 36 interposed between them. Input and output electrodes 38 and 40 are formed on the outer faces of transducers 32 and 34 respectively, and other electrodes 42 and 44 are applied to the inner faces (i.e. those adjacent common conductor 36) of transducers 32 and 34. These electrodes 38, 40, 42 and 44 are formed in a conventional way such as from an organic suspension of silver.

The conductor 36 is preferably a thin metallic foil secured to electrodes 42 and 44 by thin layers 48 and 50 respectively of a fast-setting adhesive. One adhesive which has been found to be especially suitable here is a modified cyanoacrylate adhesive manufactured by Eastman Chemical Products Co. under the trademark "Eastman 910." This adhesive produces extremely thin bonds between the electrodes 42 and 44 and the conductor 36. It sets with substantially no change in volume and is seen to absorb and reflect very little acoustical energy as would tend to reduce the efficiency of the coupling element. Preferably, the entire opposing surfaces of electrodes 42 and 44 are bonded to the conductor 36 to further reduce interfering reflections caused by different acoustical impedances between the two transducers. Adhesive layers 48 and 50 may also be loaded with silver powder to make them electrically conductive to assure good electrical contact between the common conductor 36 and electrodes 42 and 44. The coupling element is then polarized by a D.C. electric field as will be described later.

For purposes of illustration, the transducers 32 and 34 are shown as thin discs whose resonant frequency is determined primarily by their diameter. It will be appreciated, however, that the teachings of this invention are applicable also to coupling elements employing bonded-together transducers of other shapes as well.

The coupling elements 12 and 14 are connected together in series between source 30 and the load $R_L$. More particularly, the input terminal 18 is connected via lead 24 to the outer electrode 38 of coupling element 12. The outer electrode 40 of coupling element 12 is, in turn, connected by a lead 52 to the outer electrode 38 of coupling element 14. Also, outer electrode 40 of coupling element 14 is connected via lead 26 to output terminal 20. The inner electrodes 42 and 44 of both coupling elements 12 and 14 are connected through their respective conductors 36 and leads **28*a* and 28*b* to the common terminal 22**.

Conventionally, when the transducers 32 and 34 of one coupling element, say element 12, are axially polarized, an alternating voltage applied between its electrodes 38 and 42 will cause transducer 32 to vibrate. These vibrations are acoustically coupled to transducer 34 where they derive an output voltage between the two electrodes 40 and 44. The output voltage is a function of acoustical amplitude and is therefore at a maximum at the resonant frequency of the coupling element 12. As such, these coupling elements can function as tuned filters between electrical circuits. As noted above, however, the frequency response characteristic of such single coupling elements leaves much to be desired.

I have discovered that the passband of coupling elements 12 and 14 can be shaped by proper selection of the applied polarization voltage. The bandwidth of these laminated coupling elements is found to depend not only on the Q of the element itself, but also on its coupling coefficient ($k$). The coupling coefficient depends, in turn, on the number of polarized dipoles in the ceramic material. This varies both with the ceramic composition and also with the applied polarizing stress, i.e. voltage.

I have found that if the voltage employed to polarize these elements is increased, the bandwidth of the coupling element is also increased. Thus within limits, the coupling element can be made to have a narrow band or a broad band simply by proper selection of the applied polarizing voltage. As noted, there are limits to this procedure. The ceramic must be polarized with sufficient voltage to render it piezoelectric. Also the stress from the polarization voltage applied must not exceed the strength of the ceramic material. Thus with the ceramic employed in this example, the voltage must not exceed 150 volts/mil. For a .015 inch thick disc, this amounts to an upper limit on the polarization voltage of about 2250 volts.

It will be appreciated, then, that if a high Q ceramic is employed in the coupling element and a relatively low polarizing voltage is applied, the coupling element will exhibit a narrow band response. By increasing the polarization voltage the bandwidth of the element may be broadened, as desired, up to a maximum width governed by the elastic limit of the ceramic material. By virtue of my discovery of this relationship between bandwidth and polarizing voltage, for the first time, coupling elements can be manufactured which have exactly the same construction and geometry, yet which in use will have different determined bandwidths.

It should be mentioned here that the two transducers comprising the coupling elements 12 and 14 should be polarized in the same direction, otherwise the coupling element experiences spurious bending vibrational modes which manifest themselves by altering the resonant frequency of the coupling element.

I have discovered also that when the two coupling elements 12 and 14 are connected together in series as aforesaid with their axes of polarization pointing in the same direction as indicated in FIG. 2, there is obtained a filter response curve having a remarkably improved shape.

More particularly, the curve shows exceptionally high skirt selectivity indicating good attendant filter sensitivity. Moreover, when the two elements are so aligned in cascade, the circuit never undergoes unwanted oscillation as was the case with such circuits prior to this invention, particularly when they were employed with a high input antenna.

Figure 3:
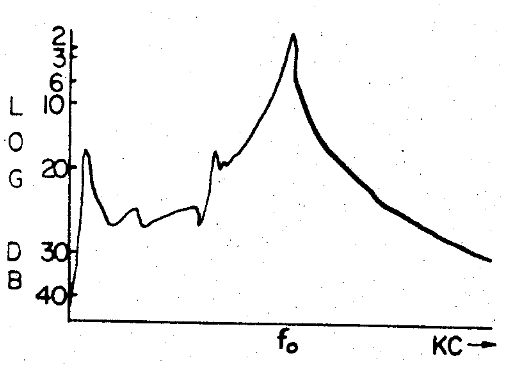
FIG. 3 is a graph of the output voltage (log scale) from a conventional single coupling element, plotted as a function of frequency.

Refer now to FIG. 3, a simplified graph of the output voltage (log scale) plotted as a function of frequency for a conventional coupling element, such as coupling element 12, connected in the circuit of FIG. 1. The abscissa of the FIG. 3 graph represents a 100 kc. sweep. In this example, the transducers are each 0.025 inch thick and 0.210 inch in diameter. The transducer ceramic material has a dielectric constant of 1200 and a mechanical Q 350. The internal resistance of $R_s$ of the source is approximately 10,000 ohms and the load resistance $R_L$ is between 200 and 5000 ohms. The coupling element transducers have been polarized by a direct voltage of 1100 volts, and the element is tuned to 262 kc. ($f_0$). At the 6 db points, the bandwidth is approximately 4.7 kc. The output voltage from the coupling element is, however, 30 db below the level at $f_0$ at approximately 81.0 kc. from the center frequency. It is seen, therefore, that the 30 db bandwidth is more than 17 times the 6 db bandwidth. Further, a loss of approximately 3.5 db was incurred.

Figure 4:
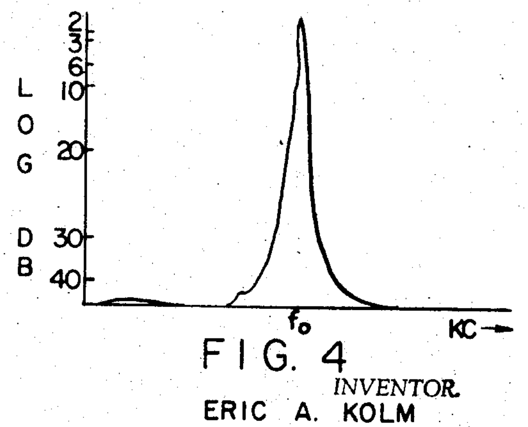
FIG. 4 is a similar graph for my composite filter incorporating a pair of such coupling elements.

Compare now the FIG. 4 graph which represents a similar plot for the composite filter of FIGS. 1 and 2 employing two similar coupling elements 12 and 14 connected together in series and having their transducers axially polarized in the same direction. The circuit parameters are the same as those set out above. There was no spurious oscillation, and the curve is seen to have a markedly improved shape. Here, the 6 db bandwidth is 2.5 kc., while the 30 db bandwidth is only 11.6 kc. or roughly five times that of the 6 db bandwidth. Moreover, the skirt selectivity is good, and the midband loss is not excessive, being only 9.5 db.

Figure 5:
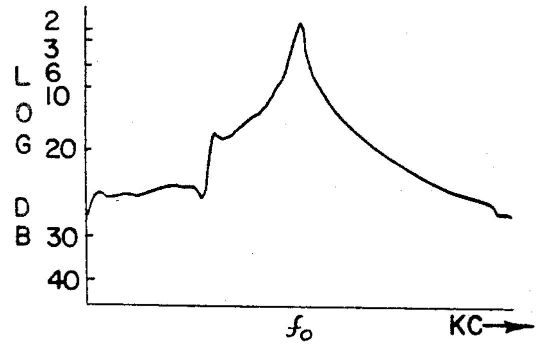
FIG. 5 is a similar graph for a conventional single coupling element wherein a higher polarization voltage was used.

FIG. 5 is a similar graph for a single piezoelectric coupling element whose transducers have been subjected to a higher polarizing voltage of 1200 volts. In other respects, the circuit parameters are the same as set out above. In this case, the 6 db bandwidth is 6.2 kc., while the 30 db bandwidth is 96.0 kc., or roughly 14 times greater than the 6 db bandwidth. Here the loss was 4 db. A comparison with FIG. 3 shows that the increased polarization voltage has resulted in a broader passband.

Figure 6:
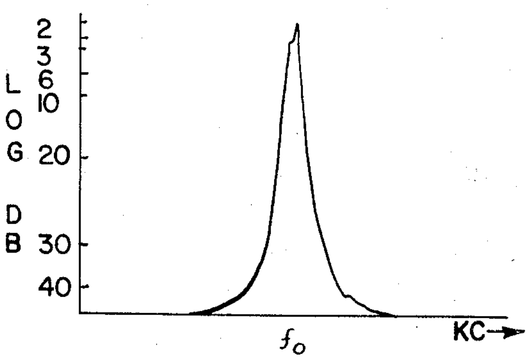
FIG. 6 is a similar graph for my composite filter whose transducers were polarized by the same higher voltage.

FIG. 6, a similar graph for a filter having transducers polarized by the same 1200 volts and connected in the same circuit, shows the composite filter as having a response curve with a vastly improved shape, as compared with FIG. 5. While the 6 db bandwidth is 3.3 kc., the 30 db bandwidth is only 14.1 kc., or less than 5 times that of the 6 db bandwidth. Here the loss incurred was approximately 8 db.

Figure 7:
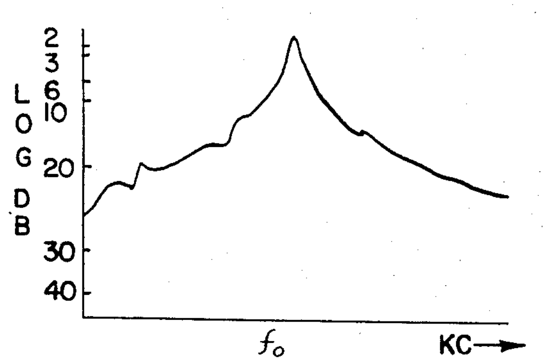
FIG. 7 is a similar graph for a single coupling element polarized by a still higher voltage.
Figure 8:
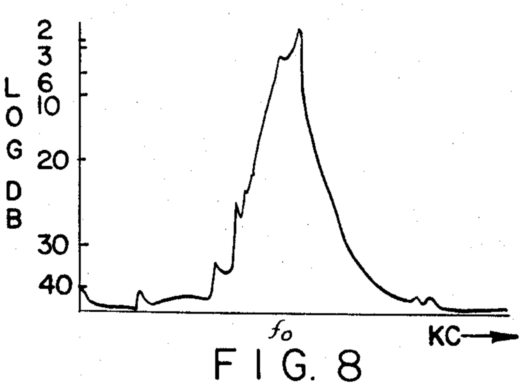
FIG. 8 is a similar graph for a composite filter employing two of the coupling elements of FIG. 7 polarized by the same voltage.

These same advantageous results obtain at still higher polarization voltages. For example, FIG. 7 is a graph for a single coupling element connected in the circuit of FIG. 1 whose transducers have been polarized by a direct voltage of 1700 volts. The 30 db bandwidth is approximately 10 times that of the 6 db bandwidth. FIG. 8 shows the corresponding composite filter made in accordance with this invention whose transducers have been polarized by the same 1700 volts. It has a 6 db bandwidth of 7.5 kc., and a 30 db bandwidth of only 30.0 kc., less than 5 times larger. Again, the loss incurred was roughly twice that of a single coupling element.

Figure 9:
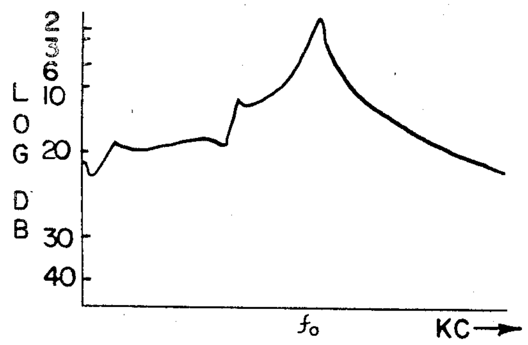
FIG. 9 is another graph of the output voltage plotted as a function of frequency for a single coupling element polarized by an even higher voltage.
Figure 10:
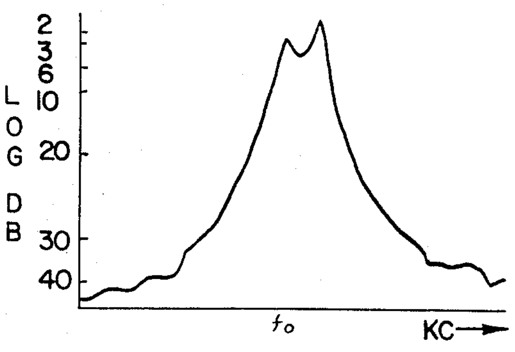
FIG. 10 is a similar graph for a composite filter employing two of the FIG. 9 coupling elements and polarized by the same direct voltage.

FIGS. 9 and 10 are similar graphs for a single coupling element and a composite filter employing two such elements axially polarized in the same direction and connected in the same FIG. 1 circuit, except that the polarization voltage here was 2500 volts. While the 30 db bandwidth of the single element was over 19 times that of the 6 db bandwidth, the 30 db bandwidth of the composite filter was only four times that of the 6 db bandwidth.

A comparison of the response curves for the single coupling elements comprising the left-hand column of drawing figures (FIGURES 3, 5, 7 and 9) shows the increase in bandwidth brought about by employing increasing polarizing voltages. This effect is even more profound for the composite filters whose curves comprise the right-hand column of figures (FIGURES 4, 6, 8 and 10). The successive pairs of said figures also illustrate the startling improvement in the shape of the response curves for the composite filters as compared with their single element brothers. Each composite filter possesses excellent cut-off characteristics. The marked improvement in response characteristics is seen to hold true even for the composite filters having broader bandwidths brought about by employing larger polarizing voltages (FIGS. 8 and 10). However, for voltages approaching the upper stress limit of the ceramic material (FIG. 10), the effects are less pronounced.

Although it is desirable that the two coupling elements 12 and 14 comprising the composite filter 10 have the same frequency of internal resonance, this is not necessary under my invention. The resonant frequencies of the two coupling elements may differ as much as a few hundred cycles so that extreme accuracy in tuning the individual coupling elements is not required.

It should be emphasized at this point that even though the characteristic curves of the individual coupling elements 12 and 14 show relatively poor cut-off characteristics, when two such elements are connected together in series such that their axes of polarization are aligned, the resultant response curve exhibits the sharp cut-off characteristics described above. This is accomplished with no great sacrifice in operating efficiency. Moreover, when the axes of polarization of the two coupling elements are so aligned, no spurious oscillations are produced in the circuit such as commonly arose in prior installations.

In summary, then, I have described a composite filter employing a pair of similar ceramic coupling elements having substantially the same frequency of internal resonance. The two elements are connected together in series so that their axes of polarization are aligned. The resultant composite filter has a passband which is extremely well shaped, having a sharp peak at the center frequency and very sharp but uniform cut-off characteristics. Moreover, when the coupling elements are so arranged, no spurious oscillations are produced in the circuit. My improved filter is extremely small and is ideally suited for use in miniaturized circuits where very good sensitivity must be realized.

I have described also a method for shaping the passband of such a composite filter by applying the proper polarizing voltage to the coupling elements. By increasing said voltage, the bandwidth of the filter is broadened, yet the curve still retains excellent cut-off characteristics.

It will be appreciated that while I have specifically described a given set of circuit parameters and geometrical shapes for purposes of illustration, other values can be employed as well without departing from the spirit of this invention. For example, in certain applications it may be desirable to provide increased support for the filter element 10 within its can 16. For this, an additional mounting post may be provided between the two coupling elements 12 and 14. The lead 52 connecting the two coupling elements may be connected at the centers of electrodes 40 and 38 and secured also to that added post to suspend the filter 10 from four spaced points.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A composite electric filter comprising a first piezoelectric coupling element including first and second ceramic transducers acoustically coupled together and having opposite electroded faces, a second piezoelectric coupling element including third and fourth ceramic transducers acoustically coupled together and having opposite electroded faces, each element being subjected to a direct voltage in excess of that required to polarize it, but less than the stress limit voltage for the ceramic, first means for electrically connecting the electrodes of said first transducer to a source of alternating voltage, second means for electrically connecting the electrodes of said second transducer to the electrodes of said third transducer, third means for electrically connecting the electrodes of said fourth transducer to a load, all of said transducers being axially polarized in the same direction.

2. A composite electric filter as defined in claim 1 wherein said first and second transducers are coupled together on opposite sides of a first common conductor and said third and fourth transducers are coupled together on opposite sides of a second common conductor.

3. A composite electric filter as defined in claim 2 and a container, said coupling elements being suspended within said container by said conducting means.

References Cited

UNITED STATES PATENTS

| | | | |
|---|---|---|---|
| 3,174,122 | 3/1965 | Fowler et al. | 333—72 |
| 3,189,851 | 6/1965 | Fowler | 333—72 |

ROY LAKE, *Primary Examiner.*

DARWIN R. HOSTETTER, *Assistant Examiner.*